(12) United States Patent
Wang et al.

(10) Patent No.: US 7,999,834 B2
(45) Date of Patent: Aug. 16, 2011

(54) DISPLAY DEVICE

(75) Inventors: Wei-Jen Wang, Taipei Hsien (TW);
Shih-Pao Cheng, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 899 days.

(21) Appl. No.: 11/964,787

(22) Filed: Dec. 27, 2007

(65) Prior Publication Data

US 2009/0109131 A1    Apr. 30, 2009

(30) Foreign Application Priority Data

Oct. 24, 2007    (CN) .......................... 2007 1 0202232

(51) Int. Cl.
*G09G 3/00* (2006.01)
*G06F 1/16* (2006.01)
*H05K 7/00* (2006.01)

(52) U.S. Cl. .......................... 345/698; 345/31; 345/660
(58) Field of Classification Search .................. None
See application file for complete search history.

(56) References Cited

U.S. PATENT DOCUMENTS

| 5,579,769 A * | 12/1996 | Yoshida et al. ............... 600/437 |
| 2004/0198435 A1 | 10/2004 | Gauld et al. |
| 2006/0107566 A1 * | 5/2006 | Van Rens ........................ 40/515 |
| 2008/0150885 A1 * | 6/2008 | Overwijk et al. .............. 345/107 |
| 2010/0033435 A1 * | 2/2010 | Huitema ........................ 345/173 |

FOREIGN PATENT DOCUMENTS

WO    2005015302    2/2005

* cited by examiner

*Primary Examiner* — Amare Mengistu
*Assistant Examiner* — Jennifer Zubajlo
(74) *Attorney, Agent, or Firm* — Altis Law Group, Inc.

(57) ABSTRACT

A display device includes a body including a stationary portion and an extendible portion movable relative to the stationary portion, an expandable display portion having a display area, an adjustable resistor, and a controlling unit. The first end of the expandable display is engaged in the stationary portion, and an opposite second end of the expandable display is engaged in the extendible portion. The adjustable resistor has a resistance varying with a distance between the stationary portion and the extendible portion. The controlling unit is configured for adjusting a size of the display area according to the resistance of the adjustable resistor.

7 Claims, 8 Drawing Sheets

US 7,999,834 B2

DISPLAY DEVICE

BACKGROUND

1. Field of the Invention

The present invention relates to display technology, and particularly, to a display device.

2. Description of Related Art

Generally, an aspect ratio of a display area of a display device is constant. If images of different sizes (e.g., aspect ratios of 1:1, 4:3, and 16:9), are displayed in full screen mode on the display area, the image is distorted to fit the display area; if the image is displayed in its original size, the display area may not be fully utilized or part of the image may be cropped.

What is needed, therefore, is to provided a display device that can satisfactorily display images of different sizes thereon.

SUMMARY

The present invention relates to a display device. The display device includes a body including a stationary portion and an extendible portion movable relative to the stationary portion, an expandable display portion having a display area, an adjustable resistor, and a controlling unit. The first end of the expandable display is engaged in the stationary portion, and an opposite second end of the expandable display is engaged in the extendible portion. The adjustable resistor has a resistance varying with a distance between the stationary portion and the extendible portion. The controlling unit is configured for adjusting a size of the display area according to the resistance of the adjustable resistor.

Other advantages and novel features of the present invention will become more apparent from the following detailed description of present embodiments when taken in conjunction with the accompanying drawings, in which:

DETAILED DESCRIPTION OF THE INVENTION

Figure 1:
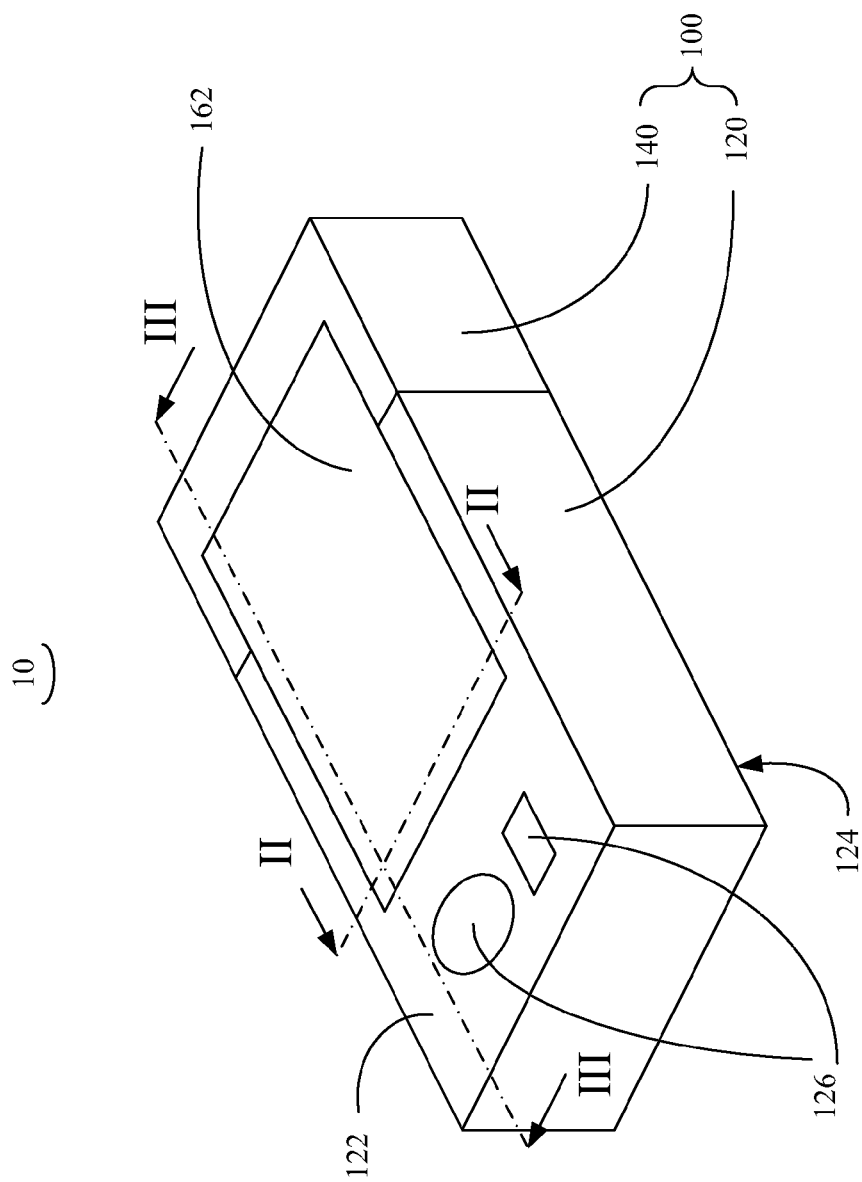
FIG. 1 is an isometric view of a display device, showing the display device in a first state, in accordance with a first present embodiment.

Reference will now be made to the figures to describe the present embodiments in detail.

Referring to FIGS. 1, 2, 4, and 5, a display device 10, according to a first present embodiment, is shown. The display device 10 includes a body 100, an expandable display portion 160 having a display area 162, an adjustable resistor 200, and a controlling unit 180. The display device 10 is a portable display area, such as a communication terminal, a digital still camera, or a camcorder.

The body 100 includes a stationary portion 120 and an extendible portion 140 movable relative to the stationary portion 120. The stationary portion 120 includes a front surface 122 (understood as a surface facing a user), and a rear surface 124 (understood as a surface away from the user) opposite to the front surface 122. Further, the stationary portion 120 is provided with a plurality of keys 126 on the front surface 122 of the stationary portion 120 for the user to operate the display device 10.

Figure 2:
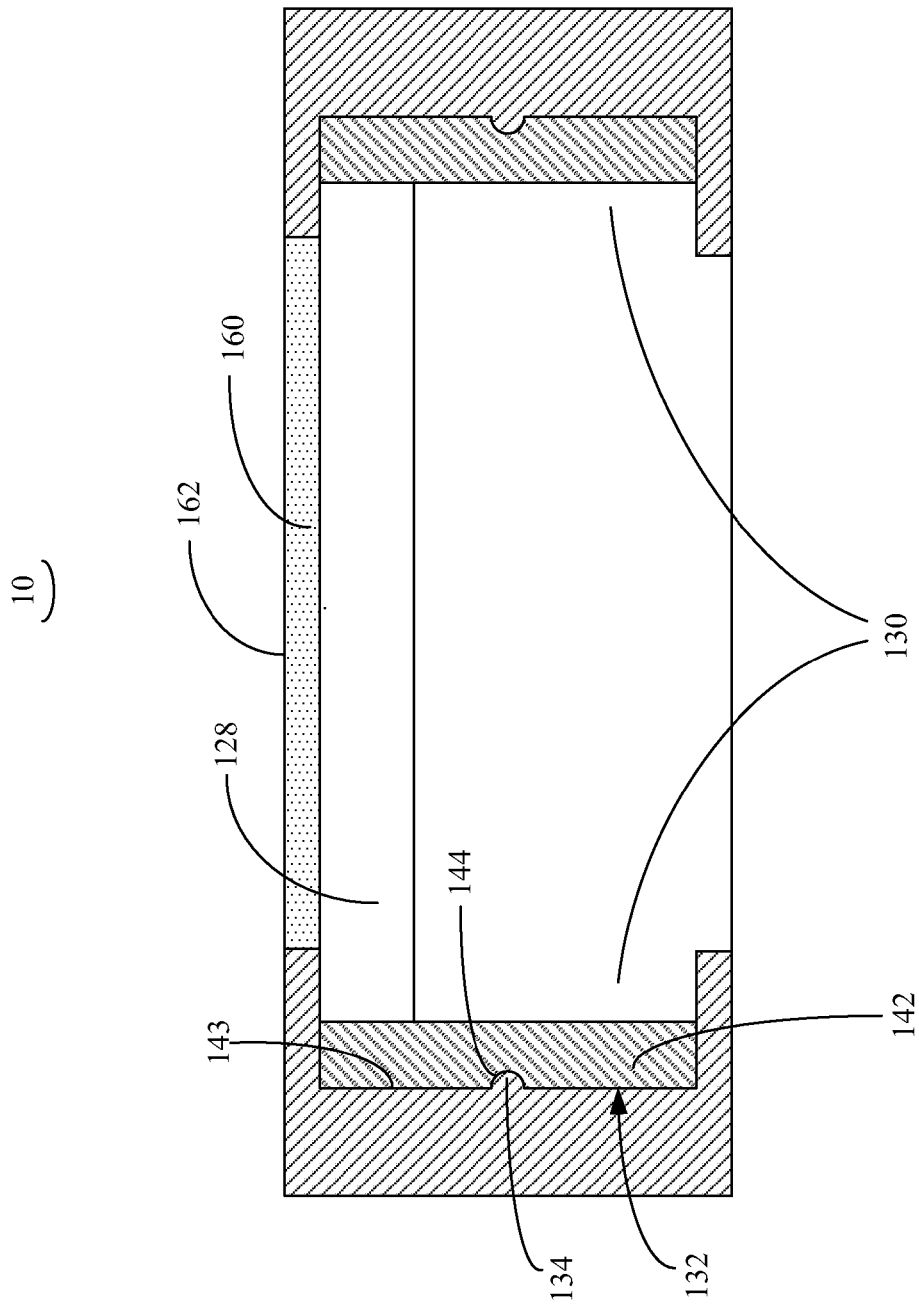
FIG. 2 is an enlarged cross-sectional view taken along line II-II of FIG. 1.

Referring to FIGS. 1 and 2, the stationary portion 120 further includes two guiding rails 130 extending along a same direction parallel to a moving direction of the extendible portion 140, and a first rotating shaft 128. The guiding rail 130 is provided with three engaging protrusions 134 (e.g., a left engaging protrusion 134, a middle engaging protrusion 134, and a right engaging protrusion 134 along a direction from the stationary portion 120 to the extendible portion 140, only the left engaging protrusion 134 is shown in FIG. 2) arranged along a extending direction of the guiding rail 130 on a bottom surface 132 of the guiding rail 130. In this present embodiment, each engaging protrusion 134 is a segmented protrusion.

An axial direction of the first rotating shaft 128 is approximately perpendicular to the extending direction of the guiding rail 130. It is to be understood that a terminal of the first rotating shaft 128 runs through a gear wheel (not shown) driven by a motor (not shown) in the display device 10. Therefore, the first rotating shaft 128 is driven by the motor to rotate.

Figure 3:
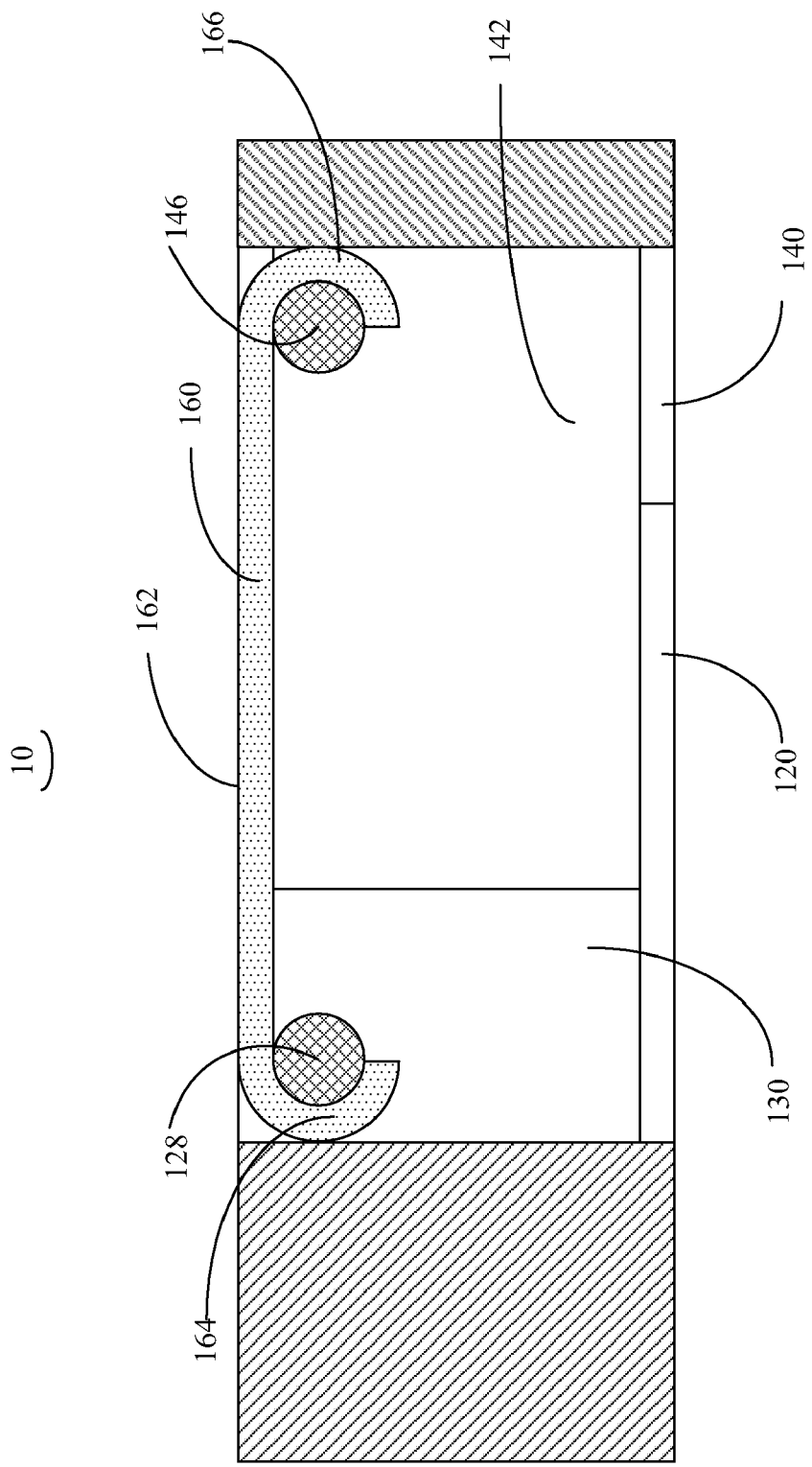
FIG. 3 is an enlarged cross-sectional view taken along line III-III of FIG. 1.

Referring to FIGS. 1, 2, and 3, the extendable portion 140 includes two guiding rods 142 (only one guiding rod 142 is shown in FIGS. 2 and 3) extending along a same direction parallel to the extending direction of the guiding rail 130, and a second rotating shaft 146. An axial direction of the second rotating shaft 146 is approximately perpendicular to the extending direction of the guiding rod 142. The two guiding rods 142 are received (at least partially received) in the two guiding rails 130, and guided by the two guiding rails 130 respectively. An engaging recess 144 is defined in a sidewall 143 of the guiding rod 142 facing the bottom surface 132 of the guiding rail 130, and corresponding to the left engaging protrusion 134. Therefore, the engaging recess 144 can fittingly engage with the engaging protrusions 134. Beneficially, the two guiding rods 142 are elastic for easily engaging the engaging recess 144 with the engaging protrusion 134, and separating the engaging recess 144 from the engaging protrusion 134, when the extendable portion 140 moves relative to the stationary portion 120.

The expandable display portion 160 is rectangular. A first end 164 of the expandable display portion 160 is engaged in the stationary portion 120, and an opposite second end 166 of the expandable display portion 160 is engaged in the extendible portion 140. In this present embodiment, the first end 164 of the expandable display portion 160 is wrapped around the first rotating shaft 128 of the stationary portion 120, and the second end 166 of the expandable display portion 160 is wrapped around the second rotating shaft 146 of the extendible portion 140, as shown in FIG. 3. The display area 162 of the expandable display portion 160 faces the user.

Figure 4:
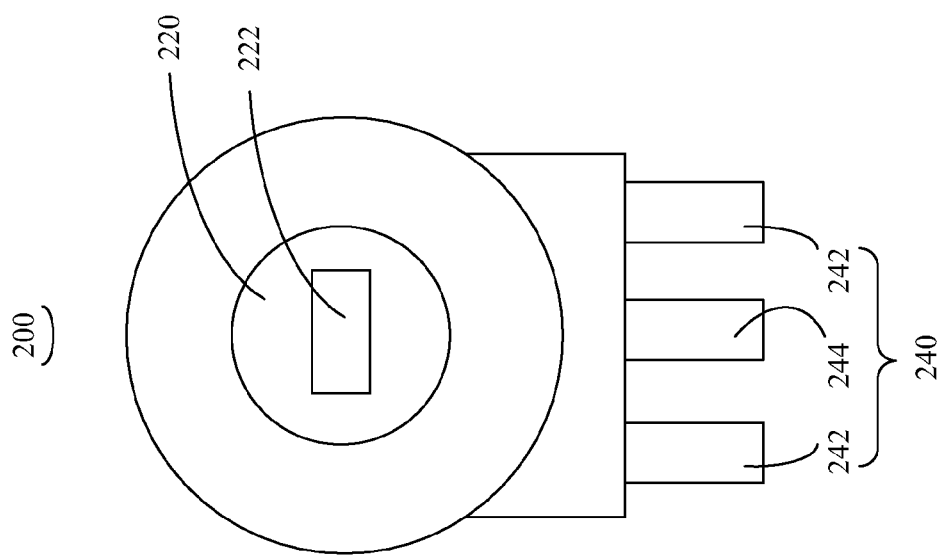
FIG. 4 is a front view of an adjustable resistor in accordance with the first present embodiment.

Referring to FIGS. 2, and 4, the adjustable resistor 200 is a film resistor in this present embodiment. The adjustable resistor 200 has a resistance varying with a distance between the stationary portion 120 and the extendable portion 140. The adjustable resistor 200 includes a resistor body (not shown), a movable contact (not shown), an adjustable portion 220, and three pins 240. The resistor body and the movable contact are received in the adjustable resistor 200, and the adjustable portion 220 is electrically connected to the movable contact. A terminal of the middle one of three pins 240 is a central pin 244 connected to the movable contact, and another terminal of the central pin 244 is connected to the controlling unit 180. A terminal of each of the other two pins 242 is connected to a terminal of the resistor body, and another terminal of each pin 242 is connected to the controlling unit 180. A terminal of the first rotating shaft 128 is coupled to the adjustable portion 220 of the adjustable resistor 200. For example, a rectangular recess 222 is defined in the adjustable portion 220, and a rectangular protrusion (not shown) is provided on a terminal of the first rotating shaft 128, and engages with the rectangular recess 222. Therefore, when the first rotating shaft 128 rotates, the adjustable portion 220 is rotated via engagement between the rectangular recess 222 and the rectangular protrusion so as to change resistance of the adjustable resistor 200. Alternatively, a terminal of the second rotating shaft 146 may be coupled to the adjustable portion 220 instead.

Each engaging protrusion 134 acts as a stage. When the extendible portion 140 is pulled from the stationary portion 120, the guiding rod 142 of the extendible portion 140 slides along the guiding rail 130 of the stationary portion 120. The engaging recess 144 engages with the left engaging protrusion 134 as a first stage, with the middle engaging protrusion 134 as a second stage, and with the right engaging protrusion 134 as a third stage.

Figure 5:
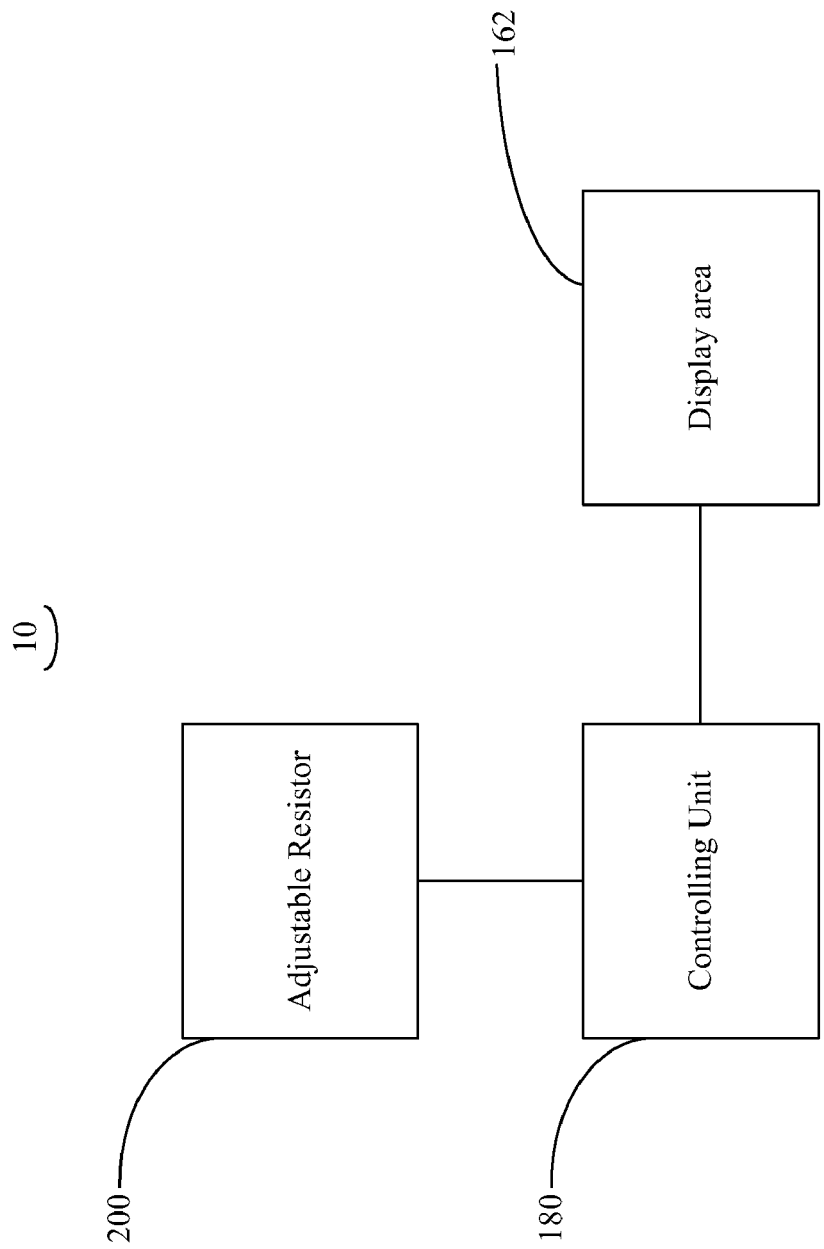
FIG. 5 is a diagram of functional modules of the display device of FIG. 1.

Referring to FIGS. 1, 4 and 5, the controlling unit 180 is configured for adjusting a size of the display area 162 according to the resistance of the adjustable resistor 200. The controlling unit 180 is built into the display device 10, and reads a voltage between one of the pins 242 and the central pin 244 of the adjustable resistor 200. For a resistance varying between one of the pins 242 and the central pin 244 of the adjustable resistor 200, the voltage therebetween is changed correspondingly. A plurality of reference voltages is pre-set in the controlling unit 180. The number of the pre-set voltages is at least the same as the number of the stages. In this present embodiment, the number of the pre-set voltages is three. The controlling unit 180 controls a size of the display area 162 of the display portion 160 according to the voltage of the adjustable resistor 200 read by the controlling unit 180.

Detail Description of the Display Device 10 Follows.

As mentioned above, three engaging protrusions 134 (the left engaging protrusion 134, the middle engaging protrusion, and the right engaging protrusion) act to provide three stages. Correspondingly, three reference voltages V1, V2, and V3 are pre-set in the controlling unit 180. The voltage V1 is a voltage of the adjustable resistor 200 read by the controlling unit 180 when the left engaging protrusion 134 engages with the engaging recess 144, the voltage V2 is a voltage of the adjustable resistor 200 read by the controlling unit 180 when the middle engaging protrusion 134 engages with the engaging recess 144, and the voltage V3 is a voltage of the adjustable resistor read by the controlling unit 180 when the right engaging protrusion 134 engages with the engaging recess 144. A distance between two engaging protrusions 134 adjacent to each other is dependent on a changeable length of the display area 162 of the expandable display portion 160 between two stages.

Initially, the left engaging protrusion 134 engages with the engaging recess 144. The controlling unit 180 reads the voltage V1 of the adjustable resistor 200. Correspondingly, the controlling unit 180 controls an aspect ratio of the display area 162 of the expandable display portion 160 to be 1:1 (e.g., 12×12 centimeters), as shown in FIG. 1.

Figure 6:
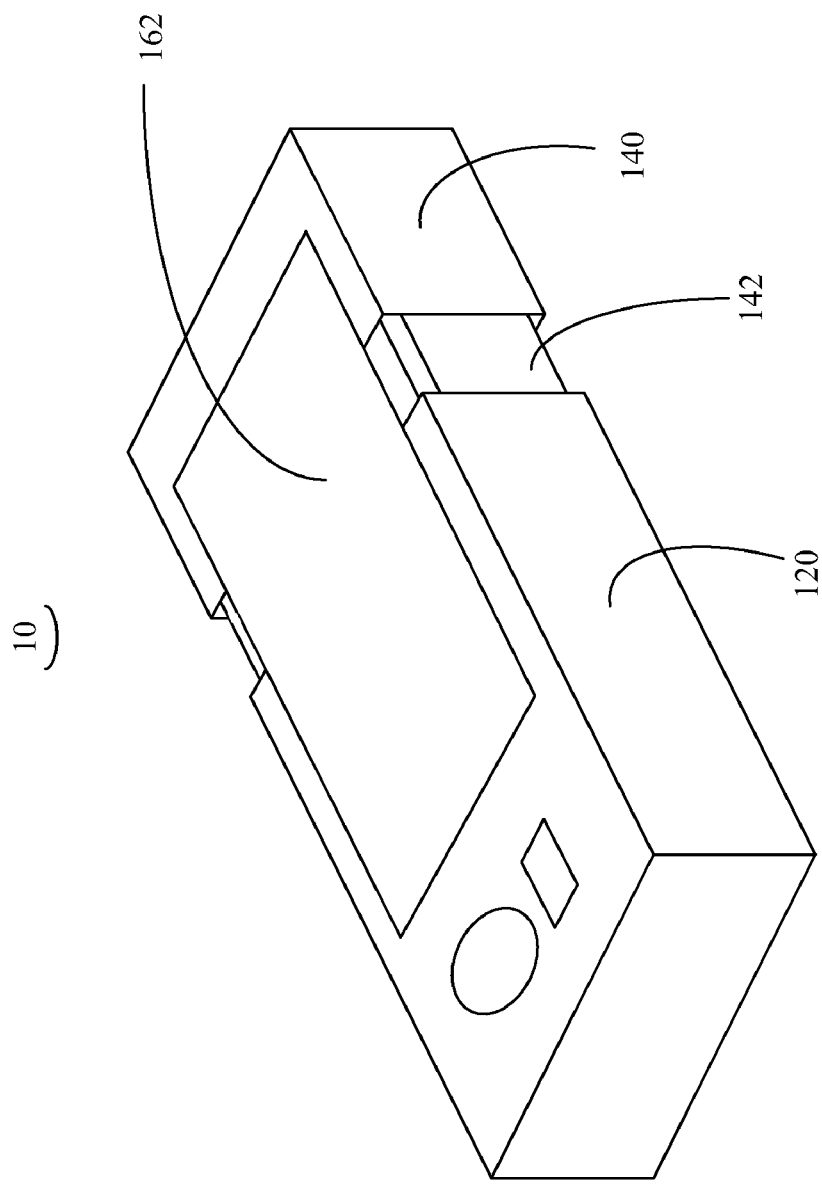
FIG. 6 is similar to FIG. 1, but showing the display device in a second state.

When an image with aspect ratio of 4:3 is displayed on the display area 162, the user may pull the extendible portion 140 out from the stationary portion 120 (as shown in FIG. 6) in a manner that the engaging recess 144 is separated from the left engaging protrusion 134, and engages with the middle engaging protrusion 134 so as to lengthen the display area 162 of the expandable display portion 160 (e.g., from 12 centimeters to 16 centimeters). The controlling unit 180 reads a voltage V2 of the adjustable resistor 200, and controls the display area 162 to display for a ratio of 4:3 (e.g., 16×12 centimeters). That is, the 4:3 image is displayed in a full screen mode without distortion thereof.

Figure 7:
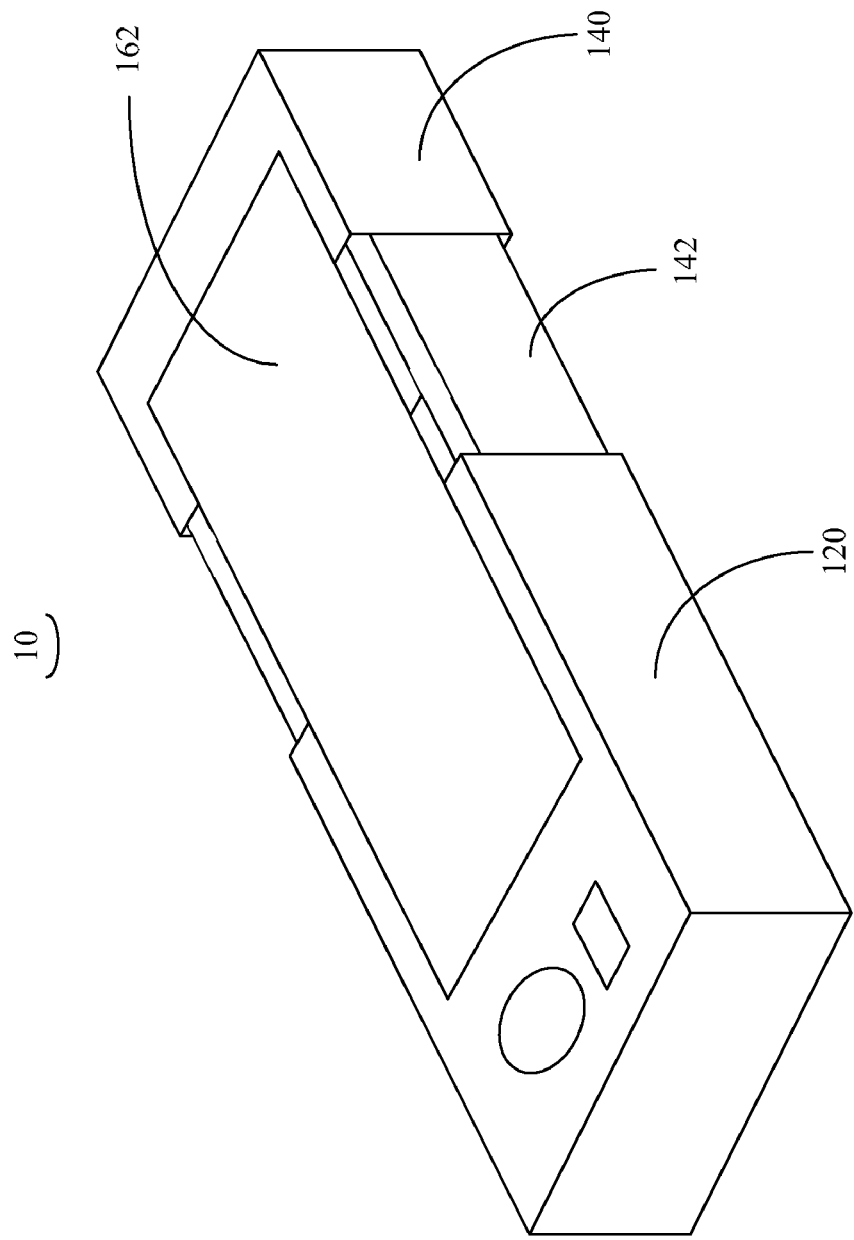
FIG. 7 is similar to FIG. 6, but showing the display device in a third state.

When an image with a ratio of 16:9 is displayed on the display area 162, the user may pull the extendible portion 140 out from the stationary portion 120 (as shown in FIG. 7) in a manner that the engaging recess 144 is separated from the middle engaging protrusion 134, and engages with the right engaging protrusion 134 so as to further lengthen the display area 162 of the expandable display portion 160 (e.g., from 16 centimeters to about 21.3 centimeters). The controlling unit 180 reads a voltage V3 of the adjustable resistor 200, and controls the display area 162 to display at 16:9 (e.g., 21.3×12 centimeters). That is, the 16:9 image is displayed in a full screen mode without distortion thereof.

Sizes of the expandable display portion 160 and the display area 162 change due to a movement of the extendible portion 140 and a changeable voltage of the adjustable resistor 200 read by the controlling unit 180 to fit a size of the image. Therefore, images of different sizes can be displayed satisfactorily.

Figure 8:
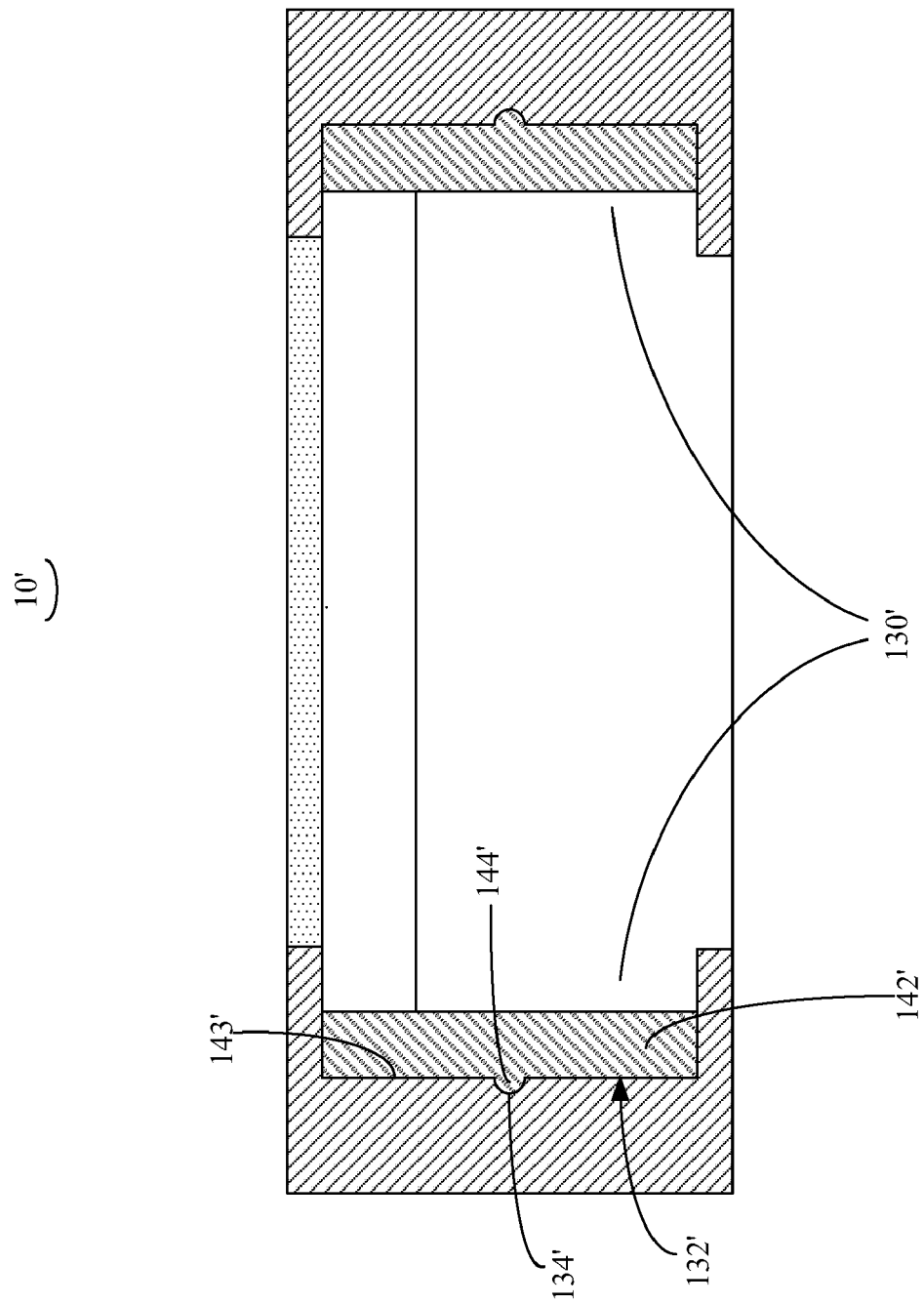
FIG. 8 is an enlarged cross-sectional view of the display device in accordance with a second present embodiment.

Referring to FIG. 8, a display device 10' according to a second present embodiment, is shown. Differences between the display device 10' and the display device 10 are that a plurality of engaging recesses 134' are defined on a bottom surface 132' of each guiding rail 130', and each guiding rod 142' is provided with a engaging protrusion 144' on a side wall 143' of each guiding rod 142' facing the bottom surface 132' of each guiding rail 130', and corresponding to the engaging recesses 134'. Advantages of the second present embodiment are similar to that of the first present embodiment.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A display device, comprising:
  a body including a stationary portion and an extendable portion movable relative to the stationary portion;
  an expandable display portion having a display area, a first end of the expandable display portion engaged in the stationary portion, an opposite second end of the expandable display portion engaged in the extendable portion, the display area configured for displaying information;
  an adjustable resistor having a resistance varying with a distance between the stationary portion and the extendable portion; and
  a controlling unit for storing a plurality of pre-set reference voltages and for adjusting a size of the display area only according to the resistance of the adjustable resistor and the pre-set reference voltages.

2. The display device as claimed in claim 1, wherein the adjustable resistor is a film resistor.

3. The display device as claimed in claim 1, wherein the stationary portion comprises a first rotating shaft, and the extendable portion comprises a second rotating shaft, and the adjustable resistor comprises a adjustable portion; the first end of the expandable display portion is wrapped around the first rotating shaft of the stationary portion, and the second end of the expandable display portion is wrapped around the second rotating shaft of the extendable portion; one of terminals of the first rotating shaft and the second rotating shaft is coupled to the adjustable portion.

4. The display device as claimed in claim 3, wherein the stationary portion comprises two guiding rails extending along a same direction parallel to a moving direction of the extendable portion; an axis of the first rotating shaft is approximately perpendicular to the extending direction of the two guiding rails; each guiding rail is provided with a plurality of engaging protrusions on a bottom surface of each guiding rail.

5. The display device as claimed in claim 4, wherein the extendable portion comprises two guiding rods extending along a same direction parallel to the extending direction of the guiding rail; an axis of the second rotating shaft is approximately perpendicular to the extending direction of the two guiding rods; the two guiding rods are received in the two guiding rails respectively; an engaging recess is defined on a side wall of each guiding rod facing the bottom surface of each guiding rail, and corresponding to the engaging protrusions.

6. The display device as claimed in claim 3, wherein the stationary portion comprises two guiding rails extending along a same direction parallel to a moving direction of the extendable portion; an axis of the first rotating shaft is approximately perpendicular to the extending direction of the two guiding rails; a plurality of engaging recesses are defined on a bottom surface of each guiding rail.

7. The display device as claimed in claim 6, wherein the extendable portion comprises two guiding rods extending along a same direction parallel to the extending direction of the guiding rail; an axis of the second rotating shaft is approximately perpendicular to the extending direction of the two guiding rods; the two guiding rods are received in the two guiding rails respectively; each guiding rod is provided with an engaging protrusion on a side wall of each guiding rod facing the bottom surface of each guiding rail, and corresponding to the engaging recesses.

* * * * *